June 30, 1953     L. G. McDEVITT     2,643,847
MIRROR SUPPORT
Filed April 6, 1951
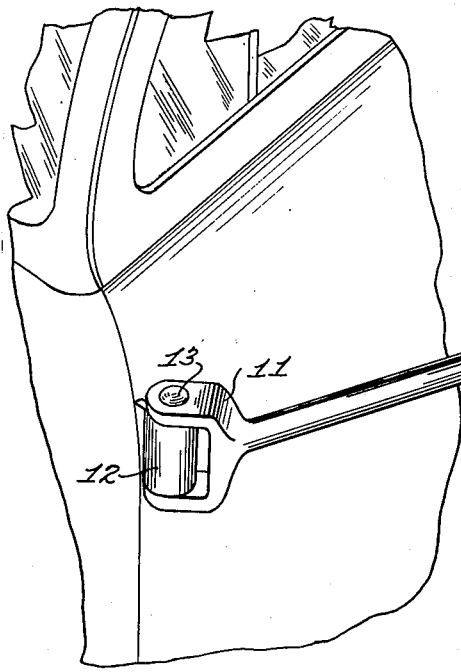
Fig. 1.
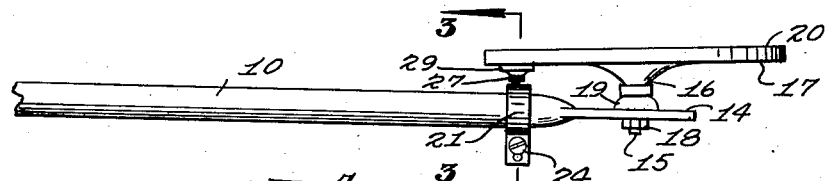
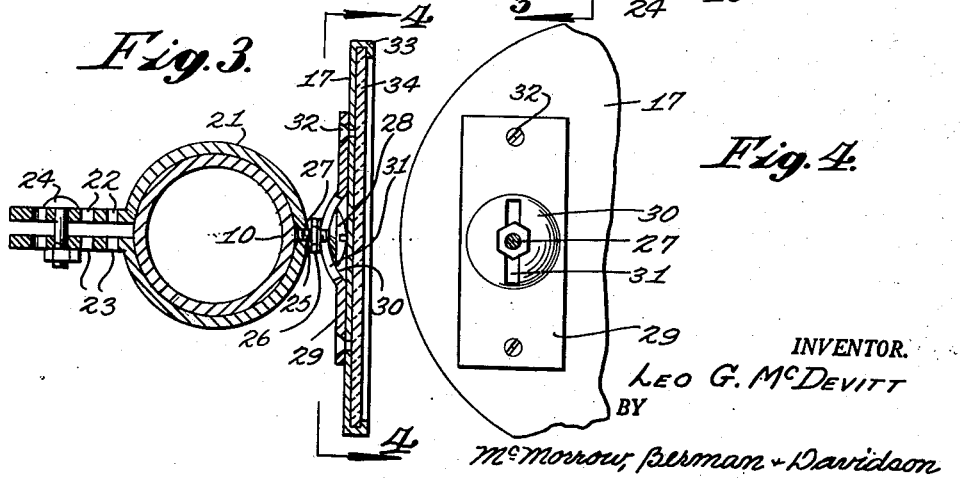
Fig. 3.    Fig. 4.
INVENTOR.
Leo G. McDevitt
BY McMorrow, Berman & Davidson
ATTORNEYS Patented June 30, 1953

2,643,847

UNITED STATES PATENT OFFICE 2,643,847

MIRROR SUPPORT

Leo G. McDevitt, Lincoln Park, Mich.

Application April 6, 1951, Serial No. 219,632

3 Claims. (Cl. 248—276)

This invention relates to article supports and more particularly to a support for maintaining a rear vision vehicle mirror permanently in adjustment.

It is among the objects of the invention to provide an improved support in the form of an attachment mounted on a mirror supporting arm and engaging the back of the mirror at a location spaced from the universal joint connection between the back of the mirror and the outer end of the mirror supporting arm to lock the mirror in selected positions of adjustment relative to the supporting arm and securely hold the mirror in adjusted position against road shocks and vibration and accidental contact by persons working on the vehicle or moving near it; which can be applied to an existing mirror and supporting arm assembly with no material modification of the mirror or arm construction; and which is simple and durable in construction, economical to manufacture, easy to install and positive and effective in use.

Other objects and advantages will become apparent from a consideration of the following description and the appended claims in conjunction with the accompanying drawing wherein:

Figure 1 is a perspective view of a fragmentary portion of an automotive vehicle and a rear vision mirror assembly with a mirror supporting attachment illustrative of the invention applied to the mirror assembly;

Figure 2 is a top plan view of the rear vision mirror assembly with the mirror support of the invention applied thereto;

Figure 3 is a cross sectional view on an enlarged scale on the line 3—3 of Figure 2; and Figure 4 is a fragmentary cross sectional view on the line 4—4 of Figure 3.

With continued reference to the drawing, the mirror assembly comprises an elongated supporting arm 10 of tubular construction having at one end a fork formation 11 providing a pair of apertured lugs disposed at respectively opposite ends of the door hinge 12 of a vehicle front door and secured to the hinge by the hinge pin 13 extending through the lugs of the fork formation 11 and through the door hinge 12. This arm is usually of circular cross sectional shape and is provided at its end remote from the fork formation 11 with a flattened portion 14 apertured to receive a screw 15 which has on one end a ball formation received in a socket 16 provided in the sheet metal back wall 17 of the mirror. A nut 18 is threaded onto the screw 15 at the side of the flattened end portion 14 of the arm remote from the mirror and a partly spherical collar 19 is disposed between the socket 16 and the adjacent side of the arm portion 14 to provide a universal joint connection between the mirror and the outer end of the arm 10, so that the mirror can be moved to various selected positions of adjustment convenient to the driver of the vehicle.

Tightening the nut 18 frictionally secures the mirror 20 in adjusted position relative to the outer end of the arm 10, but it has been found that this frictionally holding of the mirror in adjusted position is not sufficient and that where the universal joint connection between the outer end of the arm and the mirror is alone relied upon to hold the mirror in adjusted position, the mirror will move out of adjustment when subjected to vibration and road shock and is frequently moved out of position by accidental contact of persons working on the vehicle or moving near the vehicle.

The present support or stay has been devised to overcome these difficulties and comprises a split clamp or band 21, preferably of resilient sheet material shaped to constitute an elongated strip and provided near its opposite ends with a series of apertures, as indicated at 22 and 23, spaced apart longitudinally of the strip. This clamp band 21 is placed around the mirror supporting arm 10 at a location spaced from the collar 19 of the universal joint connection between the arm 10 and the mirror 20 and near the inner end of the flattened portion 14 of the arm, and is held in position on the arm by a clamp screw 24 extending through selected registering apertures of the series 22 and 23 to firmly clamp the clamp band onto the mirror supporting arm.

Substantially midway between the apertured series 22 and 23 the clamp band 21 is provided with a tapped hole 25 and a screw 27 is threaded at one end into the tapped hole and has at its opposite end a head 28 the inner and outer surfaces of which are convexly rounded. The end of the screw 27 received in the tapped hole 25 of the band is expanded or peened into the countersunk inner end of the hole to lock the screw in the hole.

A rectangular plate 29 of suitable sheet metal is secured to the back 17 of the mirror at the outer side of the back and at a location spaced from the socket 16 and this plate has substantially at its mid-length location a bulged out or dome-shaped portion 30 which receives the screw head 28, the screw head being disposed between the inner side of the plate 29 and the outer side of the mirror back 17 and this bulged out portion has an elongated slot 31 therein through which the shank of the screw 27 extends. This slot is disposed substantially perpendicular to a line extending through the centers of the socket 16 and the bulged out portion 30 of the plate 29 or at right angles to the longitudinal center line of the arm 10, to provide a limited freedom of movement between the screw and the mirror.

The plate 29 is secured to the back of the mirror by suitable means, such as the screws or rivets 32 or may be soldered or tack welded to the back of the mirror, if desired, and a lock nut 26 is threaded on the screw and bears against the bulged out portion of the plate 29 to lock the screw head in position relative to the bulged out portion of the plate in which the screw head is received.

It is to be noted that the mirror back 17 has a marginal bezel or bead formation 33 which receives the marginal portion of the mirror glass 34 to permanently secure the glass to the back.

With the above described arrangement, the nut 18 may be slightly loosened and the screw 24 also loosened, whereupon the mirror may be moved to the desired position of adjustment. If necessary, the clamp band 21 may be removed from the arm 10 and threaded outwardly or inwardly along the shank of the screw 27 to provide the proper angular relationship between the mirror and the arm. When the desired position of adjustment has been obtained, the nut 18 and the lock nut 26 are tightened and the mirror is then firmly locked in adjusted position.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a rear vision mirror assembly including a supporting arm, a mirror having a sheet metal back and a universal joint connection between one end of said arm and the back of said mirror, a split clamp of resilient material secured around said arm at a location spaced from said universal joint connection and having an aperture in the portion thereof adjacent the back of said mirror, a screw threaded at one end into the aperture in said clamp and having a head on its other end, and means providing a joint of limited freedom of frictionally resisted movement between said screw head and said mirror back at a location spaced from said universal joint connection and about an axis substantially parallel to said arm.

2. In combination with a rear vision mirror assembly including a supporting arm, a mirror having a sheet metal back, and a universal joint connection between one end of said arm and the back of said mirror, a split clamp secured around said arm at a location spaced from said universal joint connection and having a tapped hole in the portion thereof adjacent the back of said mirror, a screw threaded at one end into the hole in said clamp and locked therein, a head on the other end of said screw having convexly rounded inner and outer surfaces, a plate secured to said mirror back at a location spaced from said universal joint connection and having a bulged out portion receiving the head of said screw, said bulged out portion having an elongated slot therein extending at right angles to the longitudinal center line of said arm and receiving the shank of said screw for providing limited freedom of movement of adjustment between said mirror and said arm, and a lock nut threaded on said screw and bearing against the other side of said plate.

3. In combination with a rear vision mirror assembly including a supporting arm, a mirror having a back wall, and a universal joint connection between one end of said arm and the back of said mirror, a split clamp in the form of an elongated metal strip bent around said arm at a location spaced from said universal joint connection and having series of apertures disposed one at each end thereof with the apertures spaced apart longitudinally of the strip, a clamp screw extending through selected registering apertures of said series and firmly securing said clamp on said arm, said clamp having a tapped hole therein substantially at its mid-length location, a screw threaded at one end into said tapped hole and locked therein, a head on the other end of said screw having convexly rounded inner and outer surfaces, a plate secured to the back wall of said mirror at a location spaced from said universal joint connection and having therein a bulged out portion receiving said screw head and retaining the latter between itself and the back wall of said mirror, the bulged out portion of said plate having an elongated slot therein extending at the right angles to the longitudinal center line of said arm and receiving the shank of said screw for providing a limited freedom of movement of adjustment between said mirror and said arm when said clamp screw is loosened, and a lock nut threaded on said screw and bearing against the bulged out portion of said plate in opposition to said screw head.

LEO G. McDEVITT.

References Cited in the file of this patent

UNITED STATES PATENTS

| Number | Name | Date |
|---|---|---|
| 1,394,440 | Oishei | Oct. 18, 1921 |
| 1,428,042 | Hodny | Sept. 5, 1922 |
| 1,895,560 | Weir | Jan. 31, 1933 |